(12) United States Patent
Huang et al.

(10) Patent No.: US 11,199,264 B2
(45) Date of Patent: Dec. 14, 2021

(54) INTELLIGENT REGULATION SYSTEM AND METHOD FOR MECHANICAL SEAL

(71) Applicant: TSINGHUA UNIVERSITY, Beijing (CN)

(72) Inventors: Weifeng Huang, Beijing (CN); Xiangfeng Liu, Beijing (CN); Yuan Yin, Beijing (CN); Ying Liu, Beijing (CN); Decai Li, Beijing (CN); Yongjian Li, Beijing (CN); Shuangfu Suo, Beijing (CN); Zixi Wang, Beijing (CN); Xiaohong Jia, Beijing (CN); Fei Guo, Beijing (CN)

( * ) Notice: Subject to any disclaimer, the term of this patent is extended or adjusted under 35 U.S.C. 154(b) by 0 days.

(21) Appl. No.: 17/257,535

(22) PCT Filed: Jul. 16, 2018

(86) PCT No.: PCT/CN2018/095757
§ 371 (c)(1),
(2) Date: Dec. 31, 2020

(87) PCT Pub. No.: WO2020/006779
PCT Pub. Date: Jan. 9, 2020

(65) Prior Publication Data
US 2021/0246986 A1    Aug. 12, 2021

(30) Foreign Application Priority Data
Jul. 2, 2018  (CN) .......................... 201810708566.8

(51) Int. Cl.
*F16J 15/34*   (2006.01)
*G01M 13/005*   (2019.01)

(52) U.S. Cl.
CPC ....... *F16J 15/3492* (2013.01); *G01M 13/005* (2013.01)

(58) Field of Classification Search
CPC .......................... F16J 15/3492; G01M 13/005
See application file for complete search history.

(56) References Cited

U.S. PATENT DOCUMENTS

| 4,691,276 A    * | 9/1987 | Miller ................... G05B 13/02 700/47 |
| 2012/0112416 A1 * | 5/2012 | Berger ................. F16J 15/3492 277/358 |

FOREIGN PATENT DOCUMENTS

| CN | 104390012 A | 3/2015 | |
| EP | 3139072 A1 * | 3/2017 | ........... F16J 15/3492 |

* cited by examiner

*Primary Examiner* — Manuel L Barbee
(74) *Attorney, Agent, or Firm* — Novoclaims Patent Services LLC; Mei Lin Wong

(57) ABSTRACT

An intelligent regulation system for a mechanical seal, the system comprising: a monitoring device for measuring a signal correlated with a seal in real time; a control device, comprising a state determination module, a feasible region analysis module, an evaluation module and an optimizing module, wherein the state determination module unscrambles the signal obtained by the monitoring device to estimate the state of the seal; the feasible region analysis module determines, according to a current state, a state that the seal can reach by means of the regulating effect of a regulating device; the evaluation module evaluates a value for the state of the seal; and the optimizing module searches a feasible region, where the seal is regulated, for a regulating method with a relatively high value to the greatest extent, and accordingly sends an instruction to the regulating device; and the regulating device for actively applying an action to the seal according to the instruction given by the control device.

9 Claims, 3 Drawing Sheets

INTELLIGENT REGULATION SYSTEM AND METHOD FOR MECHANICAL SEAL

BACKGROUND OF THE PRESENT INVENTION

Field of Invention

The present invention relates to the field of fluid sealing and automatic control, and particularly relates to an intelligent adjustment system and method for mechanical seal.

Description of Related Arts

Mechanical sealing is a common form of shaft end sealing in rotary machineries. The paired moving ring and static ring rotate relative to each other to form a friction pair with a certain degree of stability, which reduces or even eliminates contact while limiting leakage. However, the stability derived from the delicate design from lubrication, dynamics, heat transfer and deformation of the seal sometimes still cannot maintain the stability of the friction pair under the influence of relatively stronger abnormal factors, resulting in a decrease in sealing performance, a shortened life, and even an occurrence of failure without warning.

In response to this problem, people propose to introduce an additional adjustment device in the seal. On the basis of real-time monitoring, feedback control is adopted to attempt to maintain the seal near a certain ideal state. The disadvantage of this method is that: due to the complexity of the mechanical seal mechanism and the compactness of the structure, the adjustment capability of the adjusting device in the mechanical seal system is often limited, which includes two aspects: the first is that a number of abnormal factors cannot be (or at least are difficult to) just counteracted by the function of one or more specific adjustment devices, not to mention that in practice, different types of adjustment devices may interfere in the occupied space; the second is that the adjustment strength of the adjustment device is limited, especially in some high-parameter mechanical seals (in general, the seals that have extremely high requirements for reliability are also high-parameter seals), the stability brought by the mechanism of the seal itself is also quite strong, and the changes caused by the adjustment device may not occupy a dominant position. These two points mean that if a certain target state is set according to the feedback control method, this target state is generally unreachable. However, the relationship between the state and performance of the seal as a nonlinear system is complicated, that is to say: it is not true that the closer the state is to a high-performance target state, the better the performance. Furthermore, in different specific applications, users may have different requirements for various aspects of the seal performance (such as leakage, wear, torque, etc.). The need for performance should be comprehensively evaluated from multiple perspectives such as safety and economy.

SUMMARY OF THE PRESENT INVENTION

In order to overcome the above shortcomings of the prior art, an object of the present invention is to provide an intelligent adjustment system and method for mechanical sealing based on real-time monitoring and analysis of the sealing state, which can search for the optimal state achievable through adjustment according to the comprehensive performance target required by the user, and adjust the seal to this state through the adjustment device.

In order to achieve the objective above, the technical solution adopted by the present invention is as follows:

An intelligent regulation system for mechanical seal, characterized in that, comprising:

a monitoring device measuring seal-related signals in real-time;

a control device, which comprises a state determination module, a feasible region analysis module, an evaluation module, and an optimization module, wherein the stat determination module interprets the signals obtained by the monitoring device to estimate a state of the seal, the feasible region analysis module determines a state of the seal that can be achieved by action of the regulation device based on a current state, the evaluation module evaluates a value of the state of the seal, the optimization module searches for an adjustment method with a most secure and/or economic benefit level as much as possible from the feasible region of the seal adjustment, and generates instructions to the adjustment device accordingly;

the adjustment device actively applies action on the seal according to the instructions given by the control device.

The monitoring device mainly comprises a sensor, a signal preprocessing device, an acquisition card, an acquisition software and necessary terminal equipment as a carrier.

The seal-related signals include upstream and downstream pressure, pressure inside the membrane, rotational speed, seal ring temperature, seal ring displacement, capacitance between seal rings, and friction pair acoustic emission, the action of the adjustment device applied on the seal is one or more of force, pressure change, shape change, and heating/cooling.

The state determination module filters the signals measured by the monitoring device and obtains a value of the measured physical quantity according to a calibration relationship; the evaluation module first calculates a performance of a given sealing state, and then integrates performance parameters according to requirements of the actual application scenario, thereby mapping each sealing state to a value.

The present invention also provides an intelligent regulation method for mechanical seal: measuring seal-related signals in real-time, executing control algorithm, generating instructions to act on the seal, and processing adjustment to the seal, wherein the control algorithm sequentially comprises a state determination element, a feasible region analysis element, an evaluation element and an optimization searching element, the state determination element interprets the signals obtained by a monitoring device to estimate a state of the seal, the feasible region analysis element determines the state of the seal that can be achieved by an adjustment action of an adjustment device based on a current state, the evaluation element evaluates a value of the state of the seal, the optimization searching element searches for a relatively higher-value of the adjustment as much as possible from the feasible range of the adjustment of the seal and generates instructions accordingly.

The state determination element filters the measured signals and obtains a value of the measured physical quantity according to a calibration relationship; when the sensor measurement does not provide all the information of the determined sealing state, the state determination algorithm gives the probability distribution of the sealing state and makes further judgments based on the adjusted signal change.

The state determination, feasible region analysis and evaluation are all based on the design method of accurate or approximate calculation of characteristic model of the seal, the characteristic model of the seal refers to what kind of performance will be brought about by the seal in a specific state, what monitorable elements will be produced, and how the state will change in the future.

Compared to the existing technologies, the advantageous effect of the present invention is:

Aiming at the problem that the linear feedback algorithm in the active adjustment of the mechanical seal is not applicable due to the capacity limitation of the adjustment mechanism and the nonlinear characteristics of the sealing system, an optimization strategy is formulated according to the specific application.

DETAILED DESCRIPTION OF THE PREFERRED EMBODIMENT

In order to make the objectives, technical solutions and advantages of the embodiments of the present invention clearer, the technical solutions in the embodiments of the present invention will be described clearly and completely in conjunction with the accompanying drawings in the embodiments of the present invention. It should be understood that the specific embodiments described here are only used to explain the present invention, but not intended to limit the scope of the claimed invention.

Figure 1:
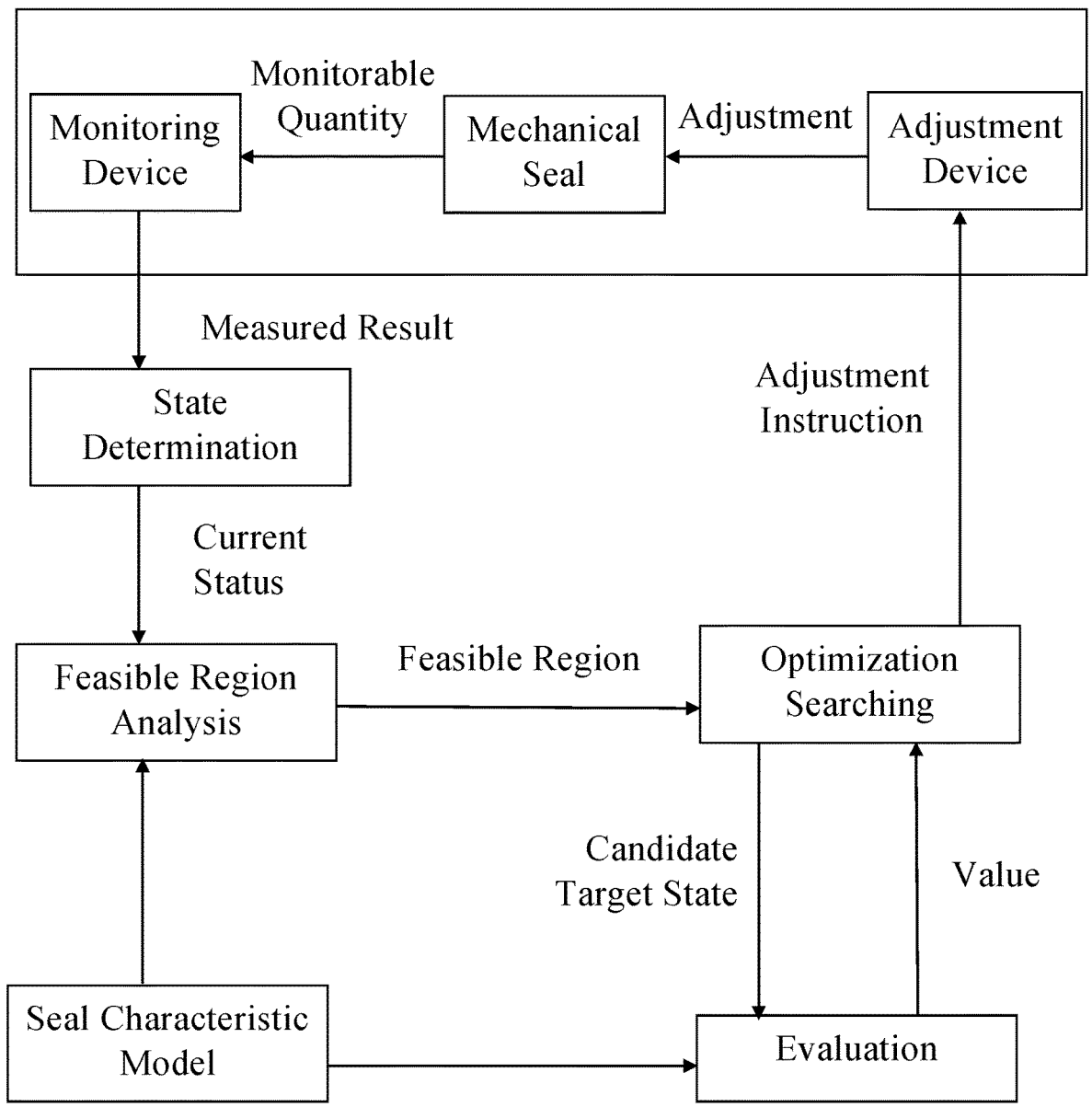
FIG. 1 illustrates a typical combination of three devices in the system of the present invention, and the combination can also be adjusted if necessary. Under their action, the seal can achieve the maximum value in specific application scenarios as much as possible and achieve the purpose of precise regulation.

Referring to FIG. 1, the present invention provides an intelligent adjustment system for mechanical seals based on real-time monitoring and analysis of the sealing state, which searches for the best and reachable state through adjustment according to the comprehensive performance goals required by the user, and adjust the seal to this state through the adjustment device, which comprises:

(1) Monitoring Device

The monitoring device mainly comprises sensors, signal preprocessing devices (such as amplifiers, signal converters, etc.), acquisition cards, acquisition software, and necessary terminal equipment (such as industrial computers) as a carrier. The monitoring device measures a variety of seal-related signals in real time, and the available ones usually include upstream and downstream pressure, membrane pressure, speed, seal ring temperature, seal ring displacement, seal ring capacitance, friction pair acoustic emission, etc.

(2) Control Device

The control algorithm carrier is the software and the terminal equipment that runs it. Different from traditional feedback control, the control algorithm of the present invention mainly includes the following elements: state determination, feasible region analysis, evaluation and searching optimization.

The state determination link interprets the signal obtained by the monitoring device to estimate the state of the seal. It filters the measured signal and obtains the value of the measured physical quantity according to the calibration relationship. For some signal types, it is also necessary to calculate based on the corresponding seal model (for example, the temperature measured at a certain point in the seal ring is used to calculate the severity of friction on the seal end face based on the heat transfer analysis of the seal). Sometimes the sensor measurement cannot provide all the information to determine the sealing state. At this point, the state determination algorithm gives the probability distribution of the sealing state, and make further determination based on the adjusted signal change.

The feasible region analysis link determines the state of the seal that can be achieved by the adjustment of the adjustment device based on the current state.

The evaluation link evaluates the value of the state of the seal. It first calculates its performance from a given sealing state, and then combines the performance parameters according to the actual application scenarios. In general, this link maps each sealing state to a value.

The optimization link searches for a higher-value adjustment method as much as possible from the feasible range of sealing adjustment, and generates instructions to the adjustment device accordingly.

Wherein the state determination, feasible region analysis and evaluation are based on the characteristic model of the seal—that is, what kind of performance and monitorable elements will be brought about by the seal in a specific state, and how the state will change in the future—to design accurate or approximate calculation method.

(3) Adjustment Device

The adjustment device actively applies action on the seal according to the instructions given by the control algorithm (this action may be in various forms such as force, pressure change, shape change, heating/cooling, etc., of course, it also includes a combination of multiple forms of action.)

The two preferred embodiments of the present invention are as follows:

Preferred Embodiment 1

A certain mechanical seal is used to seal non-hazardous and non-polluting materials. It is hoped that while avoiding the wear of the sealing ring to avoid the cost of replacing the sealing ring, it also reduces leakage as much as possible to increase the material yield and ultimately maximize economic benefits.

Figure 2:
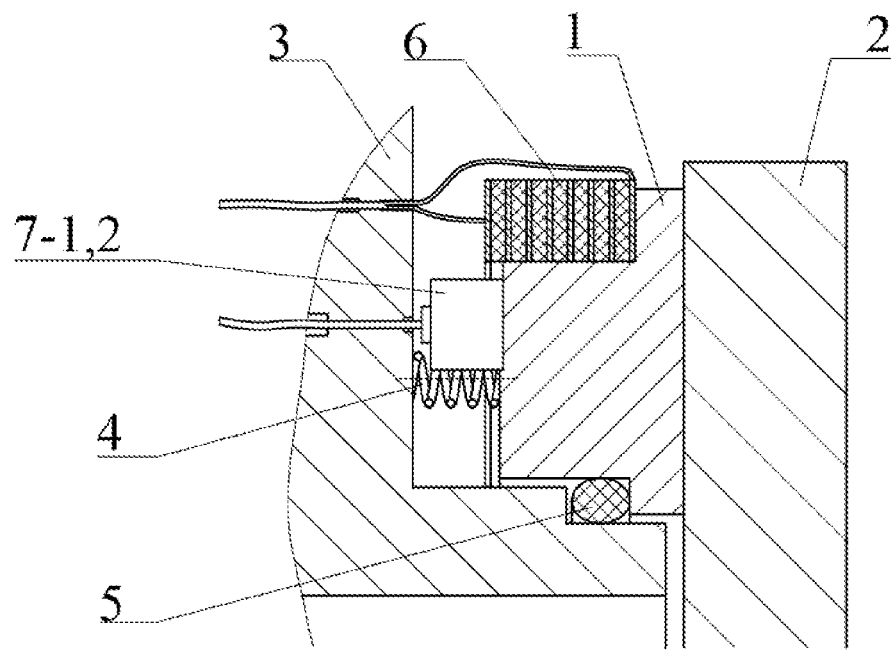
FIG. 2 is a schematic diagram of seal structure adopting static ring floating design according to a preferred embodiment 1 of the present invention.
Figure 3:
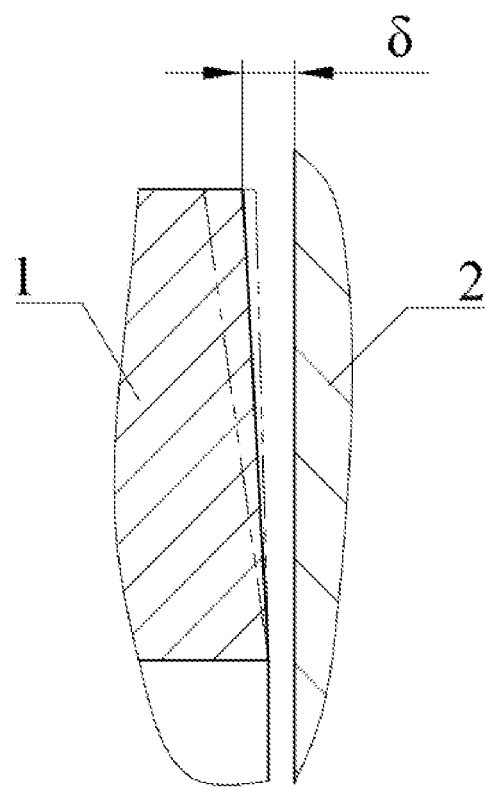
FIG. 3 is a schematic diagram of cone height adjustment according to a preferred embodiment 1 of the present invention.

Referring to FIG. 2 to FIG. 3, the seal adopts a static ring floating design (the static ring 1 transforms the spring 4 to floatingly support on the static ring seat 3, and leakage from the gap between the static ring seat 3 is prevented by the secondary seal 5). The phospholipid stacking ring 6 is aligned precisely on the static ring 1 of the seal, which can change the cone height 6 of the end face of the seal when a voltage is applied (as shown in FIG. 3): the increase in cone height (only the convergent cone is involved in this embodiment) will increase the hydrostatic effect of the seal, increase the gap between the static ring 1 and the moving ring 2, thereby reducing or eliminating contact, but the leakage will be increased.

Two micro acoustic emission sensors 7 are symmetrically arranged on the back of the static ring to measure the acoustic emission signal from the seal friction pair.

The state determination algorithm determines the sealing state based on the signal measured by the acoustic emission sensor. The detailed method is as follows:

(1) According to the pre-measured material acoustic emission spectrum library (The frequency bands of the acoustic emission signal appeared which is caused by the contact friction of a specific material pair, and the changes in the proportion of each frequency band caused by different degrees of friction), the intensity of contact and the distribution of contact pressure can be obtained from a short segment (The length of time is much shorter than that of the shaft cycle) of acoustic emission signal (When the contact is more derived from the compression of the two rings, the distribution of contact pressure will be more dispersed; if the contact is more derived from the deflection of the two rings, the distribution of contact pressure will be more concentrated). Through experimental determination, the power of each frequency band of the acoustic emission signal can be calibrated as a function of the distance between the axial centers of the two rings and the angle between the two rings;

(2) Compare the phases of the signals measured by the two acoustic emission sensors to get the approximate position of the main components in the sound source. The distance between the axial centers of the two rings and the angle between the two rings obtained from the change of this position with the rotation of the shaft and (1) changes with the deflection moment of the moving ring, and then the deflection moment of the static ring and the degree of axial compression are obtained.

The feasibility analysis algorithm presets a number of cone height nodes of the adjustment device which is reachable by the adjustment device, analyzes the state of the seal will be in at each node, and obtains the curve of the reachable state through their interpolation. Such an analysis can be achieved by adopting a relatively mature numerical model of mechanical seal.

The evaluation algorithm first obtains the expected wear rate (which is related to contact pressure distribution and rotation speed) and leakage rate (which is calculated from the deflection of the moving ring, the deflection moment of the static ring and the degree of axial compression) from a given seal state, and then converts them into the economic loss rate caused by seal ring wear and material leakage.

The optimization algorithm performs searching of one-dimensional optimization in the feasible region obtained by the aforesaid feasibility algorithm to obtain the target state that can make the economic loss rate as small as possible (The process of calculating the economic loss rate from the candidate target state generated in the algorithm is completed by the aforementioned evaluation algorithm), and analyzes the cone height required to achieve the target state, then the adjustment device changes the voltage across the two terminals of the piezoelectric stack ring 6 accordingly. Taking into account the nonlinearity of the problem, the simulated annealing algorithm is used for optimization processing in order to avoid convergence to the local optimal solution:

(1) In view of the feature that the feasible region is one-dimensional, transform the feasible region into a state parameter p;

(2) Take a feasible initial state parameter p(0), and calculate its corresponding loss rate q(0) by the aforementioned evaluation algorithm;

(3) Let n=0;

(4) Based on the current state parameter, namely p(n), randomly transform $p'(n+1)=p(n)+e(q(n))$, where e is a random quantity, which is subject to $k1 \cdot q(n)$ as the standard deviation, 0 is a Gaussian distribution of the mean (but the part that makes p'(n+1) infeasible is truncated from the distribution);

(5) Calculate the loss rate q'(n+1) corresponding to p'(n+1) by the aforementioned evaluation algorithm;

(6) If $q'(n+1) \leq q(n)$, then accept the new solution, that is, let p(n+1)=p(n), and accordingly q(n+1)=q'(n+1); otherwise, accept the new solution with the probability of $P=\exp(-(q'(n+1)-q(n))/(k2 \cdot q(n)))$. If the new solution is not accepted, then let p(n+1)=p(n), and accordingly q(n+1)=q(n);

(7) Determine whether the end condition is met (n reaches the upper limit or the new solution has not been accepted for multiple times), if it is ended, take this p(n+1) as the result; otherwise, n is accumulated by 1, and jump to (4).

Preferred Embodiment 2

This is a seal used for a cooling system which is needed to make emergency adjustments in the event of a failure, so as to ensure that the cooling system maintains normal operation before the temperature of the working machine is sufficiently low as far as possible.

Figure 4:
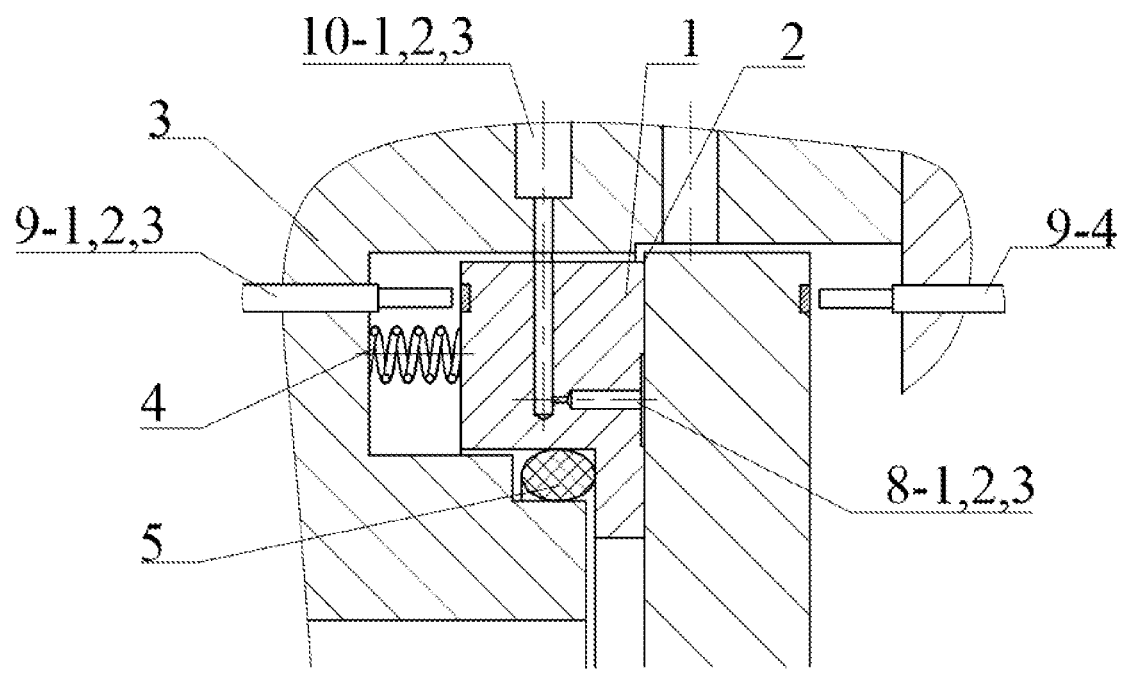
FIG. 4 is a schematic diagram of seal structure adopting static ring floating design according to a preferred embodiment 2 of the present invention.
Figure 5:
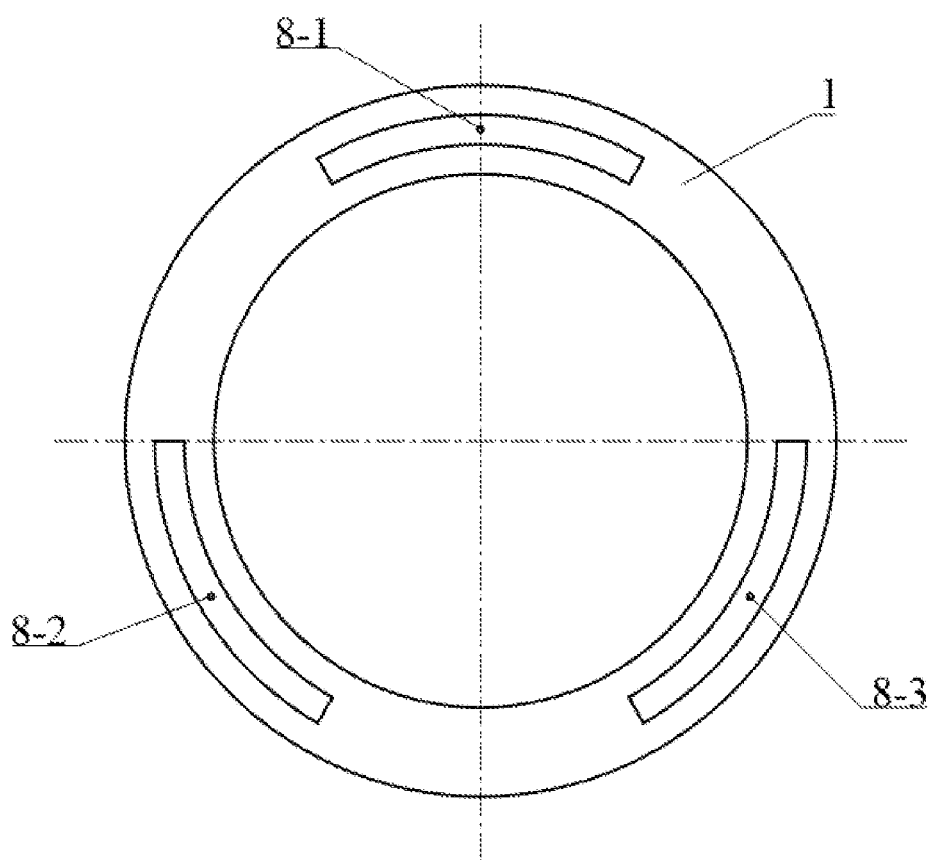
FIG. 5 is a schematic diagram of static ring end face of FIG. 3.

Referring to FIG. 4, the seal adopts a static ring floating design. FIG. 5 is a schematic diagram of the end face of the static ring. The three orifices 8 on the end face of the static ring 1 are respectively guided to three independently controlled fluid sources 10, and the pressure of each fluid source can be independently changed within a certain range. Adjusting the pressure of these fluid sources can affect the fluid pressure distribution on the end surface, thereby realizing the adjustment of the sealing state. It can effectively compensate for the overall close or far away distance of the two rings and the tilt of the static ring. However, other problems (such as the inclination of the moving ring 2, the wear of the sealing end face, the aging of the sealing support parts, the fluid medium containing abrasive particles, etc.) cannot be directly compensated, but it is still possible to indirectly reduce its adverse effects through reasonable adjustments.

Four eddy current displacement sensors 9 are arranged to measure the movement of the seal ring. Three of them (9-1,2,3) are evenly distributed on the back of the static ring in the circumferential direction, and one (9-4) is arranged on the back of the moving ring.

The state determination algorithm determines the deflection condition of the moving ring of the seal and the floating support condition of the static ring from the measured seal ring movement: the measured movement from the sensor on the back of the moving ring is referred to as the deflection movement of the moving ring; in the movement measured on the back of the static ring, the components that are consistent with those measured by the sensor on the back of the moving ring (Suppose the measured motion on the back of the static ring is Us, and the measured motion on the back of the moving ring is Ur, define a standardized norm $\|\cdot\|$ and find min ($\|s-\alpha \cdot Ur\|$), give Us-$\alpha \cdot$Ur after the norm is minimized.) are filtered out, and then the condition of the static ring floating support (which is further decomposed into three components: axial and two angular) is obtained, and finally four parameters are used to indicate the sealing state.

The feasibility analysis algorithm presets $2^3=8$ combinations of the three fluid source pressure limit settings. The mechanical seal numerical model is used to analyze the state of the seal under each combination, and the approximate boundary of the state which is reachable enclosed by them.

The evaluation algorithm obtains the expected wear rate from the given sealing state, calculates the expected future leakage rate change under the influence of this wear rate, and further estimates the time required for the cooling system to drop the working machine below the safe temperature under such future leakage changes.

The optimization algorithm adopts the simulated annealing algorithm, processes random transformation in the feasible region obtained by the aforementioned feasibility algorithm to the candidate state, uses the aforementioned evaluation algorithm to calculate its time requirement, and decides whether to use the new candidate state for the next iteration according to certain acceptance criteria. Finally, the target state of which the time requirement is as small as possible is found, and after finding the target state, analyze the pressure of the controlled fluid source required to achieve the target state and sent to the adjustment device. The specific method is basically similar to that of Embodiment 1:

(1) Standardize the aforementioned four parameters representing the sealing state and define it as a state vector p;

(2) Take a feasible initial state vector p(0), and calculate its corresponding time requirement q(0) by the aforementioned evaluation algorithm;

(3) Let n=0;

(4) Based on the current state parameter, namely p(n), randomly transform p'(n+1)=p(n)+e(q(n)), where e is a random quantity, which is subject to k1·q(n) as the standard deviation, 0 is the four-dimensional Gaussian distribution of the mean (but the part that makes p'(n+1) infeasible is truncated from the distribution);

(5) Calculate the time requirement q'(n+1) corresponding to p'(n+1) by the aforementioned evaluation algorithm;

(6) If q'(n+1)≤q(n), then accept the new solution, that is, let p(n+1)=p(n), and accordingly q(n+1)=q'(n+1); otherwise, accept the new solution with the probability of P=exp(−(q'(n+1)−q(n))/(k2·q(n))). If the new solution is not accepted, then let p(n+1)=p(n), and accordingly q(n+1)=q(n);

(7) Determine whether the end condition is met (n reaches the upper limit or the new solution has not been accepted for multiple times), if it is ended, take this p(n+1) as the result; otherwise, n is accumulated by 1, and jump to (4).

What is claimed is:

1. An intelligent regulation system for mechanical seal, comprising:
   a monitoring device measuring seal-related signals in real-time;
   a control device; and
   an adjustment device actively applies action on a seal according to instructions given by said control device, wherein said control device comprises a state determination module, a feasible region analysis module, an evaluation module, and an optimization module, wherein said state determination module interprets the signals obtained by said monitoring device to estimate a state of the seal, said feasible region analysis module determines a state of the seal that can be achieved by the action of said adjustment device based on a current state, said evaluation module evaluates a value of the state of the seal, said optimization module searches for an adjustment method with a most secure and/or economic benefit level as much as possible from the feasible region of the seal adjustment, and generates the instructions to said adjustment device accordingly.

2. The intelligent regulation system for mechanical seal accordingly to claim 1, characterized in that: said monitoring device mainly comprises a sensor, a signal preprocessing device, an acquisition card, an acquisition software and necessary terminal equipment as a carrier.

3. The intelligent regulation system for mechanical seal accordingly to claim 1, characterized in that: the seal-related signals include upstream and downstream pressure, pressure inside the membrane, rotational speed, seal ring temperature, seal ring displacement, capacitance between seal rings, and friction pair acoustic emission, wherein the action of the adjustment device applied on the seal is one or more of force, pressure change, shape change, and heating/cooling.

4. The intelligent regulation system for mechanical seal accordingly to claim 1, characterized in that: said state determination module filters the signals measured by said monitoring device and obtains a value of the measured physical quantity according to a calibration relationship; said evaluation module first calculates a performance of a given sealing state, and then integrates performance parameters according to requirements of the actual application scenario, thereby mapping each sealing state to a value.

5. An intelligent regulation method for mechanical seal, comprising the steps of: measuring seal-related signals in real-time, executing control algorithm, generating instructions to act on the seal, and processing adjustment to the seal, wherein said control algorithm sequentially comprises a state determination element, a feasible region analysis element, an evaluation element and an optimization searching element, said state determination link interprets the signals obtained by a monitoring device to estimate a state of the seal, said feasible region analysis element determines the state of the seal that can be achieved by an adjustment action of an adjustment device based on a current state, said evaluation element evaluates a value of the state of the seal, said optimization searching element searches for a relatively higher-value of the adjustment as much as possible from the feasible range of the adjustment of the seal and generates instructions accordingly.

6. The intelligent regulation method for mechanical seal according to claim 5, characterized in that: the seal-related signals comprises upstream and downstream pressure, membrane pressure, rotation speed, seal ring temperature, seal ring displacement, capacitance between seal rings, and friction pair acoustic emission, wherein the act on the seal comprises one or a combination of force, pressure change, shape change, and/or heating/cooling.

7. The intelligent regulation method for mechanical seal according to claim 5, characterized in that: the state determination element filters the measured signals and obtains a value of the measured physical quantity according to a calibration relationship; when the sensor measurement does not provide all the information of the determined sealing state, the state determination algorithm gives the probability distribution of the sealing state and makes further judgments based on the adjusted signal change.

8. The intelligent regulation method for mechanical seal according to claim 5, characterized in that: said evaluation module first calculates a performance of a given sealing state, and then integrates performance parameters according to requirements of the actual application scenario, thereby mapping each sealing state to a value.

9. The intelligent regulation method for mechanical seal according to claim 5, characterized in that: the state determination, feasible region analysis and evaluation are all based on the design method of accurate or approximate calculation of characteristic model of the seal, the characteristic model of the seal refers to what kind of performance will be brought about by the seal in a specific state, what monitorable elements will be produced, and how the state will change in the future.

* * * * *